United States Patent
Makihara et al.

(10) Patent No.: US 11,181,082 B2
(45) Date of Patent: Nov. 23, 2021

(54) VENTILATION DUCT

(71) Applicant: Toyota Jidosha Kabushiki Kaisha, Toyota (JP)

(72) Inventors: Yasuhisa Makihara, Toyota (JP); Ryo Nakamura, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/013,390

(22) Filed: Jun. 20, 2018

(65) Prior Publication Data

US 2019/0128222 A1 May 2, 2019

(30) Foreign Application Priority Data

Oct. 26, 2017 (JP) .............................. JP2017-206783

(51) Int. Cl.
  *F02M 35/10* (2006.01)
  *B60K 11/08* (2006.01)
  *F02M 35/16* (2006.01)

(52) U.S. Cl.
  CPC ....... *F02M 35/10118* (2013.01); *B60K 11/08* (2013.01); *F02M 35/10131* (2013.01); *F02M 35/16* (2013.01)

(58) Field of Classification Search
  CPC ....... F02M 35/10131; F02M 35/10118; B60K 11/06; B60K 11/08; F01P 11/10; F01P 5/06
  See application file for complete search history.

(56) References Cited

U.S. PATENT DOCUMENTS

| | | | | |
|---|---|---|---|---|
| 5,121,715 | A | * | 6/1992 | Nogami ................... F01P 11/12 123/198 E |
| 5,794,733 | A | * | 8/1998 | Stosel ..................... B60K 13/02 180/68.1 |
| 2004/0031471 | A1 | * | 2/2004 | Leuenberger .......... F02M 29/06 123/590 |
| 2007/0045029 | A1 | * | 3/2007 | Nozaki .................. B60K 13/02 180/291 |

(Continued)

FOREIGN PATENT DOCUMENTS

| | | |
|---|---|---|
| CN | 206439126 U | 8/2017 |
| DE | 3230136 A1 * | 2/1984 ......... F02M 35/1211 |

(Continued)

OTHER PUBLICATIONS

English Machine Translation Provided by ESPACENET of DE-3230136-A1 (Year: 2019).*

*Primary Examiner* — Michael A Kessler

(74) *Attorney, Agent, or Firm* — Dinsmore & Shohl LLP

(57) ABSTRACT

A ventilation duct includes an intake port through which fluid is sucked in a different direction from an up-down direction; a discharge port that is located above the intake port; a connecting portion that connects the intake port and the discharge port, and a duct inner surface that is an inner surface of the connecting portion, the duct inner surface being provided such that a fluid channel is provided inside the duct inner surface. A wall portion is provided to linearly extend upward from a lower surface of the duct inner surface and to extend in a right-left direction when seen from an upstream side in a flow direction of the fluid flowing through the fluid channel.

7 Claims, 5 Drawing Sheets

(56) References Cited

U.S. PATENT DOCUMENTS

| | | | | |
|---|---|---|---|---|
| 2010/0032220 A1* | 2/2010 | Ohira | ............... | F02M 35/10013 |
| | | | | 180/68.3 |
| 2011/0017535 A1* | 1/2011 | Salvesen | ................ | F02M 35/08 |
| | | | | 180/68.3 |
| 2012/0111653 A1* | 5/2012 | Stuckey | ................. | B60K 11/08 |
| | | | | 180/68.3 |
| 2012/0211293 A1* | 8/2012 | Leanza | ................. | B60K 13/02 |
| | | | | 180/68.3 |
| 2014/0299396 A1* | 10/2014 | Tajima | .................. | B60K 11/04 |
| | | | | 180/68.1 |
| 2016/0207419 A1* | 7/2016 | Ohashi | ................... | B60K 13/02 |
| 2017/0246949 A1* | 8/2017 | Roussel | ................ | B60K 11/08 |
| 2018/0093560 A1* | 4/2018 | Nitsche | ................. | B60K 11/08 |

FOREIGN PATENT DOCUMENTS

| | | | |
|---|---|---|---|
| EP | 2169210 | A2 | 3/2010 |
| JP | 62110023 | U * | 7/1987 |
| JP | H0512625 | U * | 2/1993 |
| JP | 2010-036797 | A | 2/2010 |
| JP | 2017-013680 | A | 1/2017 |
| WO | 2015080688 | A1 | 6/2015 |
| WO | 2016135972 | A1 | 9/2016 |

* cited by examiner

VENTILATION DUCT

CROSS-REFERENCE TO RELATED APPLICATIONS

This application claims priority to Japanese Patent Application No. 2017-206783 filed on Oct. 26, 2017, which is incorporated herein by reference in its entirety including the specification, drawings and abstract.

BACKGROUND

1. Technical Field

The disclosure relates to a ventilation duct that makes it possible to separate a foreign substance.

2. Description of Related Art

In Japanese Patent Application Publication No. 2017-013680 (JP 2017-013680 A), a ventilation duct (an intake duct) used to introduce air into an engine is disclosed. In a technique disclosed in the Japanese Patent Application Publication, in addition to an intake port and a discharge port, a foreign substance discharge port is further provided on a lower wall of the ventilation duct. A foreign substance such as water is separated from fluid (air) that has flowed into the ventilation duct through the intake port, and is discharged to the outside of the ventilation duct through the foreign substance discharge port.

However, in the technique disclosed in the above Japanese Patent Application Publication, since the foreign substance discharge port is provided, in addition to the foreign substance, part of air that has flowed into the ventilation duct through the intake port flows out of the ventilation duct through the foreign substance discharge port. This decreases an amount of low-temperature air (outside air) to be sucked imo the engine. As a result, a temperature of intake air of the engine may increase. Thus, for example, knocking may be more likely to occur, and combustion efficiency may be deteriorated, and accordingly, fuel economy may be deteriorated.

SUMMARY

The disclosure provides a ventilation duct that makes it possible to separate a foreign substance and to reduce the possibility that fluid flows out of the ventilation duct through a portion other than a discharge port.

A fsrst aspect of the disclosure relates to a ventilation duct including an intake port through which fluid is sucked in a different direction from an up-down direction; a discharge port that is located above the intake port; a connecting portion that connects the intake port and the discharge port; and a duct inner surface that is an inner surface of the connecting portion, the duct inner surface being provided such that a fluid channel is provided inside the duct inner surface. A wall portion is provided to linearly extend upward from a lower surface of the duct inner surface and tc extend in a right-left direction when seen from an upstream side in a flow direction of the fluid flowing through the fluid channel.

In the ventilation duct with a first configuration described above, the wall portion is provided to linearly extend upward from the lower surface of the duct inner surface and to extend in the right-left direction when seen from the upstream side in the flow direction of the fluid flowing through the fluid channel. Thus, a foreign substance that has flowed into the fluid channel through the intake port cotldes with the wall portion, and thus, the foreign substance can be separated from a primary stream of the fluid. Therefore, it is possible to reduce the possibility that the foreign substance flows out through the discharge port. In addition, since the wall portion linearly extends upward from the lower surface of the duct inner surface, unlike a case where the wall portion is smoothly curved to extend upward from the lower surface of the duct inner surface, it is possible to reduce the possibility that the foreign substance moves upward along the wall portion. In the above configuration, since the wall portion is provided and the foreign substance collides with the wall portion such that the foreign substance is separated, an opening (a foreign substance discharge port that has been required in related art) used to discharge the foreign substance is unnecessary between the intake port and the discharge port. Therefore, the fluid flowing through the ventilation duct excluding the foreign substance can be prevented from flowing out of the ventilation duct through a portion other than the discharge port.

In the above-described aspect, an angle defined by a wall portion upstream surface of the wall portion and the lower surface of the duct inner surface at a position upstream of the wall portion upstream surface may be equal to or smaller than 110 degrees, the wall portion upstream surface being a surface at an upstream side of the wall portion.

In the ventilation duct with a second configuration described above, the angle defined by the wall portion upstream surface of the wall portion and the lower surface of the duct inner surface at the position upstream of the wall portion upstream surface is equal to or smaller than 310 degrees, the wall portion upstream surface being the surface at the upstream side of the wall portion. Thus, it is possible to reduce the possibility that the foreign substance that collides with the wall portion and is separated from the primary stream of the fluid moves upward along the wall portion upstream surface and joins the primary stream of the fluid. Therefore, it is possible to improve foreign substance separation performance (i.e., performance of separating a foreign substance) provided by the wall portion.

In the above-described aspect, an upper end of the wall portion may be located at a position away from an upper surface of the duct inner surface.

In the ventilation duct with a third configuration described above, the upper end of the wall portion is located at the position away from the upper surface of the duct inner surface. Thus, even when the wall portion is provided, the fluid can flow through a space between the upper end of ihe wall portion and the upper surface of the duct inner surface. Therefore, performance of the ventilation duct can be maintained.

In the above-described aspect, the duct inner surface may include a first duct inner surface portion located upstream of the wall portion, and a second duct inner surface portion located downstream of the wall portion; the second duct inner surface portion may include a tapered portion; and in the tapered portion, a tilt angle of the lower surface of the duct inner surface with respect to a horizontal direction may be steeper than a tilt angle of an upper surface of the duct inner surface with respect to the horizontal direction such that a channel cross-sectional area is reduced toward a downstream side.

In the ventilation duct with a fourth configuration described above, the second duct inner surface portion, which is located downstream of the wall portion includes the tapered portion. Thus, a channel cross-sectional area of an upstream portion of the second duct inner surface portion is larger than a channel cross-sectional area of a downstream portion thereof, and the wall portion can be set up (provided) in the portion with the large channel cross-sectional area. Therefore, it is possible to reduce a decrease in the channel cross-sectional area caused by providing the wall portion, and is also possible to reduce an increase in pressure loss of the flow caused by providing the wall portion.

In the above-described aspect, a bent portion may be provided in the connecting portion, and a downstream portion of the bent portion is bent upward with respect to an upstream portion of the bent portion; and the wall portion may be provided on the lower surface of the duct inner surface in the bent portion.

In the ventilation duct with a fifth configuration described above, since the bent portion is provided in the connecting portion, and the downstream portion of the bent portion is bent upward with respect to the upstream portion of the bent portion, the flow direction of the fluid flowinw, through the bent portion is changed upward. In addition, the wall portion is provided on the lower surface of the duct inner surface in the bent portion. The foreign substance that has flowed into the fluid channel through the intake port attempts to flow straight due to an inertia force. As a result, a flow of the foreign substance is not bent or is not fully bent upward in the bent portion, and the fbreign substance collides with the wall portion. Therefore, the foreign substance can be efficiently separated from the primary stream of the fluid.

In the above-described aspect, the ventilation duct may be an intake duct through which air is supplied to an engine of a vehicle; and the fluid flowing through the fluid channel may be the air.

In the ventilation duct with a sixth configuration described above, in the case where the ventilation duct is the intake duct through which air is supplied to the engine of the vehicle and the fluid flowing through the fluid channel is the air, the effects obtained by the above first configuration can be obtained. Thus, it is possible to reduce the possibility that a foreign substance enters the engine, and to secure an amount of low-temperature air (outside air) to be sucked into the engine. Therefore, it is possible to reduce the possibility of occurrence of knocking, the possibility of deterioration of combustion efficiency of the engine, and the possibility of deterioration of fuel economy.

In the above-described aspect, the wall portion may be continuously provided in an entire region from a right side to a left side of the duct inner surface when seen from the upstream side in the flow direction of the fluid flowing through the fluid channel.

In the ventilation duct with a seventh configuration described above, the wall portion is continuously provided in the entire region from the right side to the left side of the duct inner surface when seen from the upstream side in the flow direction of the fluid flowing through the fluid channel. Therefore, the effects obtained by the above-described first configuration can be obtained in the entire region from the right side to the left side of the duct inner surface.

In the above-described aspect, a connecting wall portion may be provided to extend in a downstream direction from an upper end of the wall portion to the lower surface of the duct inner surface; and the connecting wall portion may extend in a horizontal direction or may extend such that a downstream end of the connecting wall portion is located above an upstream end of the connecting wall portion.

In the ventilation duct with an eighth configuration described above, the connecting wall portion is provided to extend in the downstream direction from the upper end of the wall portion to the lower surface of the duct inner surface, and the connecting wall portion extends in the horizontal direction or extends such that the downstream end of the connecting wall portion is located above the upstream end of the connecting wall portion. Thus, even in the ease where a foreigi substance cannot be fully separated by, the wall portion and thus flows beyond the wall portion, the foreign substance that has flowed beyond the wall portion can be returned to an area upstream of the wall portion along the upper surface of the connecting wall portion. Therefore, it is possible to reduce the possibility that the foreign substance that has flowed beyond the wall portion remains in an area downstream of the wall portion.

In the above-described aspect, a plurality of the wall portions may be provided at different positions in the flow direction of the fluid flowing through the fluid channel; and each of the plurality of the wall portions may have a cutout portion provided in a part of the wall portion in the right-left direction when seen from the upstream side in the flow direction of the fluid flowing through the fluid channel.

In the ventilation duct with a ninth configuration described above, the plurality of the wall portions are provided at the different positions in the flow direction of the fluid flowing through the fluid channel, and each of the plurality of the wall portions has the cutout portion provided in the part of the wall portion in the right-left direction when seen from the upstream side in the flow direction of the fluid flowing through the fluid channel. Thus, even in the ease where a foreign substance cannot be fully separated by the wall portions and thus flows beyond the wall portions, the foreign substance that has flowed beyond the wall portions can be returned to an area upstream of the wall portions through the cutout portions. Therefore, it is possible to reduce the possibility that the foreign substance that has flowed beyond the wall portions remains in an area downstream of the wall portions.

In the above-described aspect, two wall portions of the plurality of the wall portions may be provided at mutually adjacent positions in the flow direction of the fluid flowing through the fluid channel; and the cutout portions of the two wall portions may be provided at different positions from each other in the right-left direction when seen from the upstream side in the flow direction of the fluid flowing through the fluid channel.

In the ventilation duct with a tenth configuration described above, the two wall portions are provided at the mutually adjacent positions in the flow direction of the fluid flowing through the fluid channel, and the cutout portions of the two wall portions are provided at the different positions from each other in the right-left direction when seen from the upstream side in the flow direction of the fluid flowing through the fluid channel. Thus, even in the case where a foreign substance flows through the cutout portion of the upstream side wall portion of the two wall portions, the foreign substance collides with the downstream side wall portion of the two wall portions. Therefore, even in the case where the cutout portion is provided, a foreign substance separation effect (an effect of separating a foreign substance) provided by the wall portions is not degraded and can be fully obtained.

In the above-described aspect, a channel cross-sectional area of the fluid channel defined by the wall portion may be smaller than a channel cross-sectional area of the fluid channel at a position upstream of the wall portion and is smaller than a channel cross-sectional area of the fluid channel at a position downstream of the wall portion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
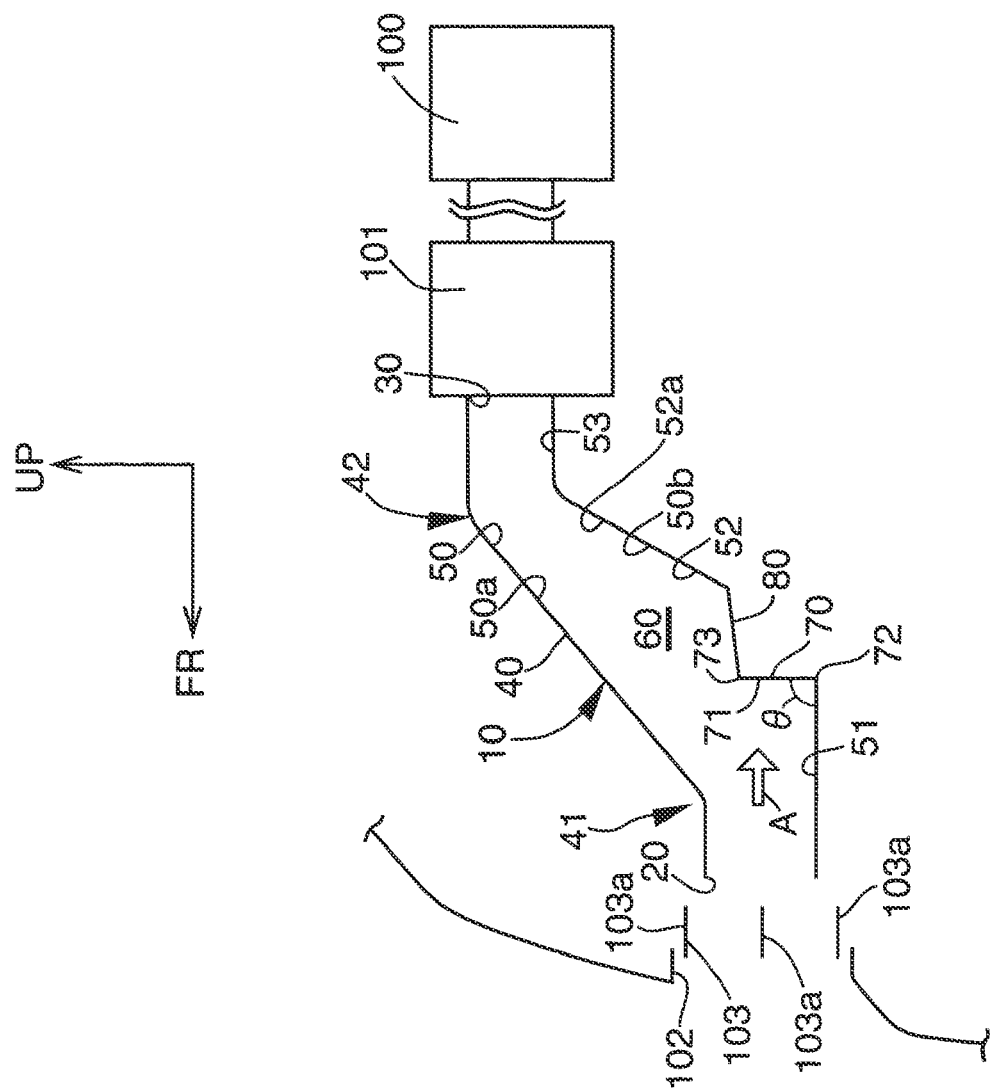
FIG. 1 is a lateral schematic view of a front portion of a vehicle in which a ventilation duct according to a first embodiment of the disclosure is disposed.
Figure 2:
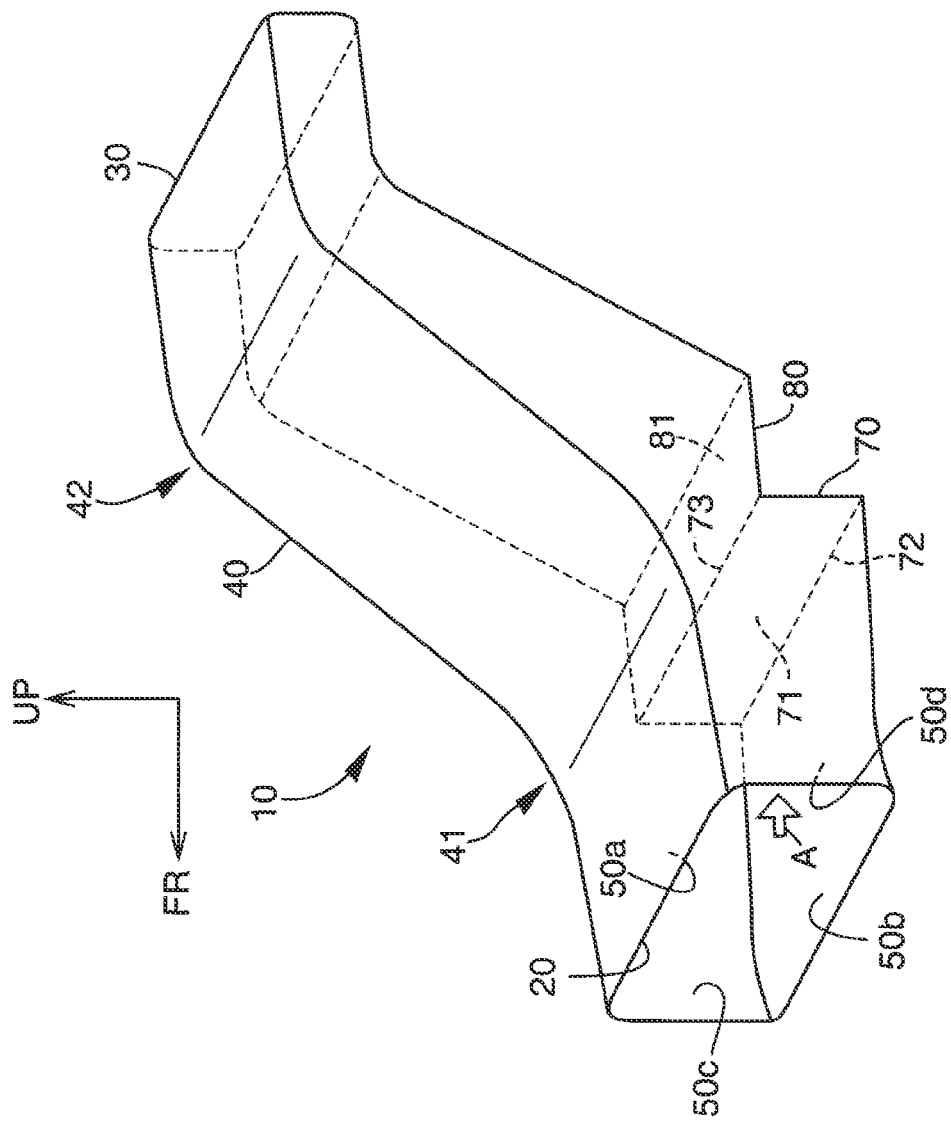
FIG. 2 is a schematic perspective view of the ventilation duct according to the first embodiment of the disclosure.
Figure 3:
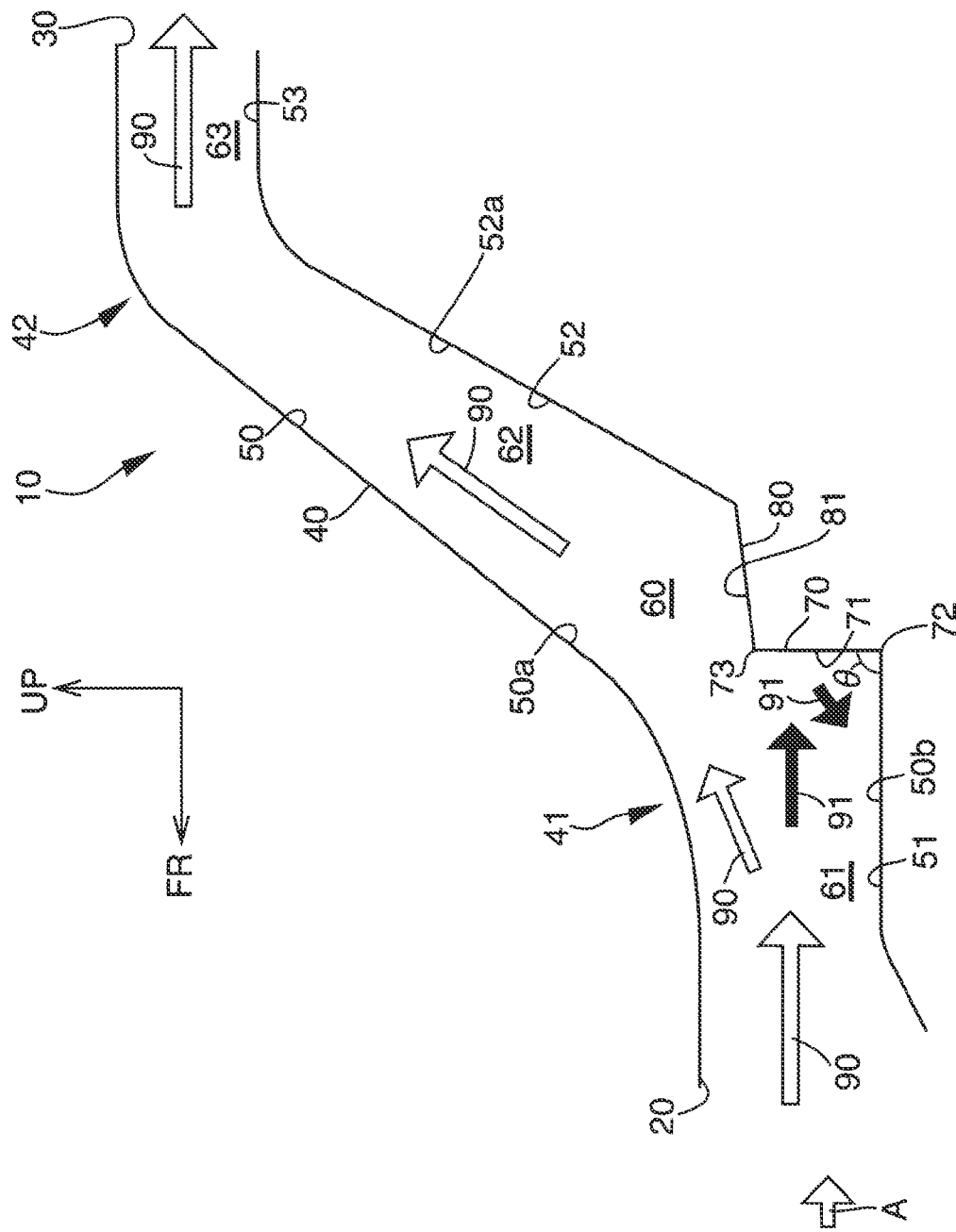
FIG. 3 is a schematic sectional view of the ventilation duct according to the first embodiment of the disclosure.
Figure 4:
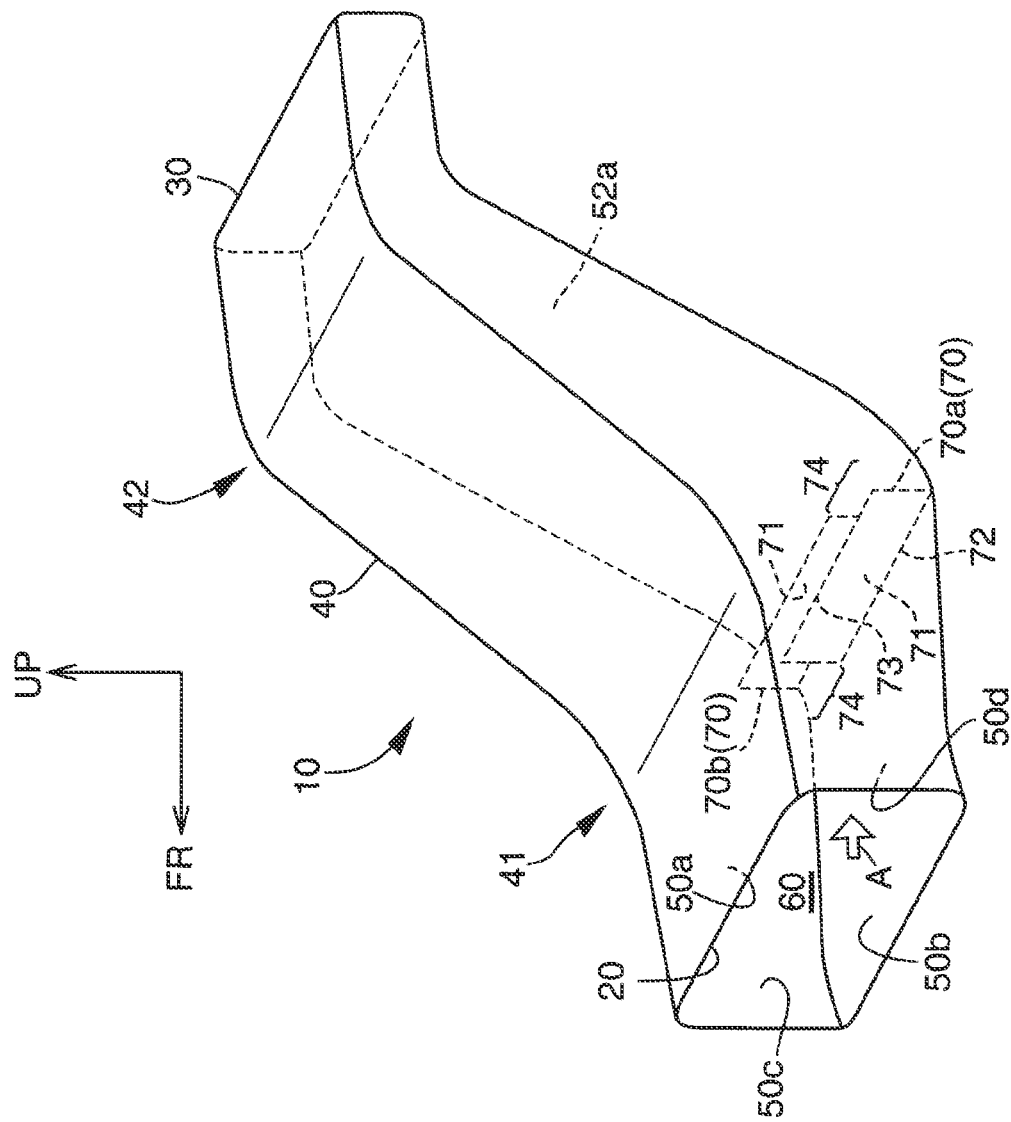
FIG. 4 is a schematic perspective view of a ventilation duct according to a second embodiment of the disclosure.
Figure 5:
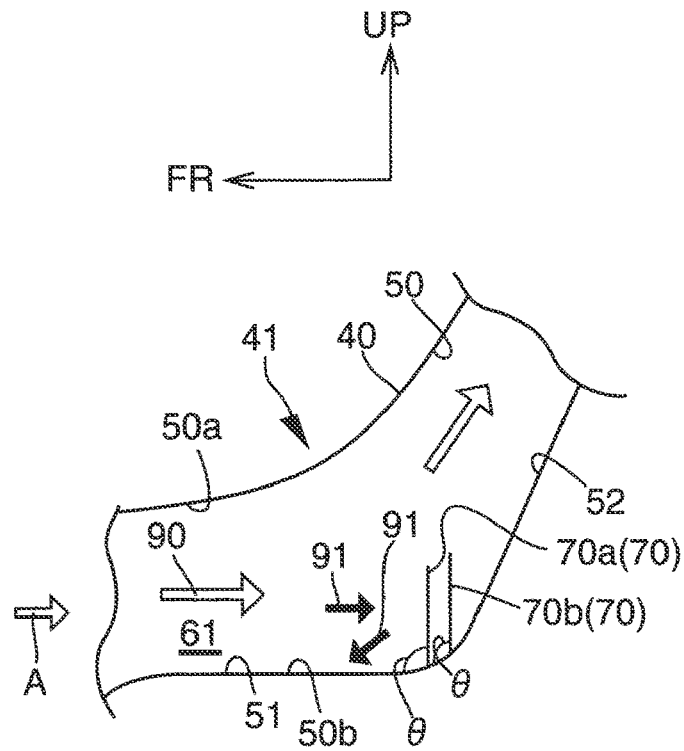
FIG. 5 is a schematic partial sectional view of the ventilation duct according to the second embodiment of the disclosure.

FIG. 1 to FIG. 3 each show a ventilation duct according to a first embodiment of the disclosure, and FIG. 4 and FIG. 5 each show a ventilation duct according to a second embodiment of the disclosure. Structural portions that are shared by the first and second embodiments of the disclosure are denoted by the same reference numerals in the first and second embodiments of the disclosure. In the drawings, UP indicates an upper side, and FR indicates a front side of a vehicle.

A description will be provided on a structure shared by the first and second embodiments of the disclosure. As shown in FIG. 1, a ventilation duct 10 according to the first and second embodiments of the disclosure is a duet for an intake system that supplies air to an engine 100 of the vehicle, and is also a duct that is provided upstream of an air cleaner 101, for example. Thus, the ventilation duct can be also referred to as an intake duct or an air guide duct.

An outside air introduction port 102 that is opened to the front side of the vehicle is provided in a front portion of the vehicle, and a front grille 103 is attached to the outside air introduction port 102. The front grille 103 has a plurality of horizontal bars 103a that are provided at certain intervals in an up-down direction. During travel of the vehicle, outside air is delivered into an engine room (may also be referred to as an engine compartment) through a space between the adjacent horizontal bars 103a.

The ventilation duct 10 is disposed behind the front grille 103 in the vehicle. The ventilation duct 10 is made of a resin, for example. The ventilation duct 10 may be constructed of a plurality of parts or may h constnicted of a single part for a purpose of reducing the number of the parts. The ventilation duct 10 includes an intake port 20, a discharge port 30 a connecting portion 40 that connects the intake port 20 and the discharge port 30 a duct inner surface 50 that is an inner surface of the connecting portion 40, and a wall portion 70. The duct inner surface 50 is provided such that a fluid channel 60 is provided inside the duct inner surface 50.

Only the single intake port 20 is provided. The intake port 20 is opened in a different direction from the up-down direction. In other words, the outside air is sucked through the intake port 20 in a different direction from the up-down direction. Note that the "different direction from the up-down direction" of the intake port 20 is for example, a horizontal direction (including a substantially horizontal direction) that is orthogonal (including substantially orthogonal) to the up-down direction, and is a direction toward the front side of the vehicle. The outside air (the air) to be delivered into the engine compartment from the front grille 103 is introduced to the inner side of the ventilation duct 10, that is, the fluid channel 60 through the intake port 20.

Only the single discharge port 30 is provided. The discharge port 30 is located above and behind the intake port 20 in the vehicle. The discharge port 30 is opened in the different direction from the up-down direction. The "different direction from the up-down direction" of the discharge port 30 is, for example, the horizontal direction (including the substantially horizontal direction) that is orthogonal (including substantially orthogonal) to the up-down direction, and is a direction toward the rear side of the vehicle. Fluid that has flowed through the fluid channel 60 is discharged to the downstream side, that is, the side downstream of the fluid channel 60 through the discharge port 30. The discharge port 30 may be, directly connected to the air cleaner 101 or may be connected to the air cleaner 101 via another duct (hose).

As shown in FIG. 2, the connecting portion 40 is provided between the intake port 20 and the discharge port 30. A bent portion 41 is provided in the connecting portion 40. A downstream portion of the bent portion 41 is bent upward with respect to an upstream portion of the bent portion 41. Since the bent portion 41 is provided, a flow direction of the fluid that has flowed into the fluid channel 60 in the horizontal direction (including the substantially horizontal direction) through the intake port 20 that is opened toward the front side of the vehicle is changed to an oblique direction toward the upper side and the rear side of the vehicle, in the bent portion 41. In the connecting portion 40, a second bent portion 42 is also provided at a position downstream of the bent portion 41, and an upstream portion of the second bent portion 42 is bent downward with respect to a downstream portion of the second bent portion 42. Since the second bent portion 42 is provided, the flow direction of the fluid, which has been changed to the oblique direction toward the upper side and the rear side of the vehicle in the bent portion 41, is changed to the horizontal direction (including the substantially horizontal direction) toward the rear side of the vehicle, in the second bent portion 42.

The duct inner surface 50 has a substantially rectangular shape whose corners are curved (rounded) in a cross-sectional view that is orthogonal to the flow direction of the fluid. The duct inner surface 50 includes an upper surface 50a, a lower surface 50b, and right and left side surfaces 50c, 50d. As shown in FIG. 3, the duct inner surface 50 includes a first duct inner surface portion 51 located upstream of the bent portion 41, a second duct inner surface portion 52 located downstream of the bent portion 41 and upstream of the second bent portion 42, and a third duct inner surface portion 53 located downstream of the second bent portion 42. The fluid channel 60 includes a first fluid channel 61 as a channel portion inside the first duct inner surface portion 51, a second fluid channel 62 as a channel portion inside the second duct inner surface portion 52, and a third fluid channel 63 as a channel portion inside the third duct inner surface portion 53.

A channel cross-sectional area of the first fluid channel 61 inside the first duct inner surface portion 51 may be constant or vary in the flow direction of the fluid. In the second duct inner surface portion 52, a tilt angle of the lower surface 50*b* of the duct inner surface 50 with respect to the horizontal direction is steeper than a tilt angle of the upper surface 50*a* of the duct inner surface 50 with respect to the horizontal direction. Accordingly, the second duct inner surface portion 52 includes a tapered portion 52*a* in which a channel cross-sectional area of the second fluid channel 62 is reduced toward the downstream side (toward the upper side) A channel cross-sectional area of the third fluid channel 63 inside the third duct inner surface portion 53 may be constant or vary in the flow direction of the fluid.

The wall portion 70 is provided to separate a foreign substance 91 such as water from fluid 90 flowing through the fluid channel 60 when the foreign substance 91 collides with the wall portion 70. The wall portion 70 is provided to linearly extend upward from the lower surface 50*b* of the duct inner surface 50 and to extend in a right-left direction when seen from the upstream side in the flow direction of the fluid flowing through the fluid channel 60 in a view seen in a direction shown by an arrow A in the drawings). Since the wall portion 70 linearly extends upward from the lower surface 50*b* of the duct inner surface 50 (at an angle with respect to the lower surface 50*l* of the duct inner surface 50), there is a linear bent line 72 between a wall portion upstream surface 71 as a surface at an upstream side of the wall portion 70 and the lower surface 50*b* of the duct inner surface 50. The linear bent line 72 extends in the right-left direction in the view seen in the direction shown by the arrow A. An extending amount of the wall portion 70 from the lower surface 50*b* of the duct inner surface 50 (i.e., a length of the wall portion 70 from the lower surface Sob in the up-down direction) is constant (including substantially constant) in the right-left direction in the view seen in the direction shown by the arrow A.

An upper end 73 of the wall portion 70 does not reach the upper surface 50*a* of the duct inner surface 50 and is located away from the upper surface 50*a* of the duct inner surface 50. Thus, the fluid channel through which the fluid flows exists between the upper end 73 of the wall portion 70 and the upper surface 50*a* of the duct inner surface 50. A (minimum) channel cross-sectional area of the fluid channel defined by the wall portion 70, that is, a (minimum) channel cross-sectional area of the fluid channel 60 at the position where the wall portion 70 is provided may be smaller than a channel cross-sectional area of the fluid channel at a position upstream of the wall portion 70 (for example, a channel cross-sectional area of the fluid channel at a position upstream of the wall portion 70 and near the wall portion 70). The (minimum) channel cross-sectional area of the fluid channel defined by the wall portion 70 may be also smaller than a channel cross-sectional area of the fluid channel at a position downstream of the wall portion 70 (for example, a channel cross-sectional area of the fluid channel at a position downstream of the wall portion and near the wall portion 70). The channel cross-sectional area of the fluid channel 60 at the position where the wall portion 70 is provided is not the minimum channel cross-sectional area in the ventilation duct 10. In the fluid channel 60, a portion having the minimum channel cross-sectional area in the ventilation duct 10 is provided at a position other than the position where the wall portion 70 is provided.

The wall portion 70 is provided at a position that faces the intake port 20. When the inside of the ventilation duct 10 is seen in the flow direction of the fluid that flows into the first fluid channel 61 from the outside upstream of the ventilation duct 10 through the intake port 20 and flows through the first fluid channel 61, the wall portion 70 is provided at a position where the wall portion 70 is visually recognizable. The wall portion 70 is provided on the lower surface 50*b* of the duct inner surface 50 in the bent portion 41. Note that this "lower surface 50*b* of the duct inner surface 50 in the bent portion 41" may include a position near the lower surface 50*b* of the duct inner surface 50 in the bent portion 41.

The wall portion 70 has a constant (including substantially constant) plate thickness. The wall portion upstream surface 71 is a flat surface (including a substantially flat surface). An angle θ that is defined by the wall portion upstream surface 71 and the lower surface SOb of the duct inner surface 50 at a position upstream of the wall portion upstream surface 71 is equal to or smaller than 110 degrees and may be equal to or smaller than 90 degrees in order to prevent the upward movement of the foreign substance 91 along the wall portion upstream surface 71.

The fluid (a primary stream) 90 that has flowed into the ventilation duct 10, that is, the fluid channel 60 through the intake port 20 first flows through the first fluid channel 61. Then, a flow direction of the primary stream 90 is changed in the bent portion 41, and the foreign substance 91 that attempts to flow straight due to an inertial force collides with the wall portion 70 and is separated from the primary stream 90. During deceleration of the vehicle, during the stop of the vehicle, or the like, the foreign substance 91 that is separated by the wall portion 70 flows toward the upstream side along the lower surface 50*b* of the duct inner surface 50 (the first duct inner surface portion 51) and is discharged to the outside of the ventilation duct 10 through the intake port 20. The primary stream 90, from which the foreign substance 91 is separated, flows through the second fluid channel 62. After the flow direction of the primary stream 90 is changed again in the second bent portion 42, the primary stream 90 flows through the third fluid channel 63 and is discharged to the outside of the ventilation duct 10 through the discharge port 30.

A description will herein be provided on effects of the structural portions shared by the first and second embodiments of the disclosure. (A) The wall portion 70 is provided to linearly extend upward from the lower surface 50*b* of the duct inner surface 50 and to extend in the right-left direction when seen from the upstream side in the flow direction of the fluid flowing through the fluid channel 60 (i.e., in the view seen in the direction shown by the arrow A in the drawings). Thus, the foreign substance 91 that has flowed into the fluid channel 60 through the intake port 20 can collide with the wall portion 70 and can be separated from the primary stream 90 of the fluid. Therefore, it is possible to reduce the possibility that the foreign substance 91 flows out through the discharge port 30. In addition, since the wall portion 70 linearly extends upward from the lower surface 50*b* of the duct inner surface 50, unlike a ease where the wall portion 70 is smoothly curved to extend upward from the lower surface 50*b* of the duct inner surface 50, it is possible to reduce the possibility that the foreign substance 91 moves upward along the wall portion 70. In the above configuration, since the wall portion 70 is provided and the foreign substance 91 collides with the wall portion 70 such that the foreign substance 91 is separated from the fluid, an opening Ia foreign substance discharge port that has been required in related art) used to discharge the foreign substance 91 is unnecessary between the intake port 20 and the discharge port 30. Therefore, the fluid (air) flowing through the ventilation duct 10 excluding the foreign substance 91 can be prevented from flowing out of the ventilation duct 10 through a portion other than the discharge port 30.

(B) The angle θ that is defined by the wall portion upstream surface 71 as the surface at the upstream side of the wall portion 70 and the lower surface 50*b* of the duct inner surface 50 at the position upstream of the wall portion upstream surface 71 is equal to or smaller than 110 degrees. Thus, it is possible to reduce the possibility that the foreim substance 91 that collides with the wall portion 70 and is separated from the primary stream 90 of the fluid moves upward along the wall portion upstream surface 71 and joins the primary stream 90. Therefore, it is possible to improve foreign substance separation performance (i.e., performance of separating a foreign substance) provided by the wall portion 70.

(C) The upper end 73 of the wall portion 70 is located away from the upper surface 50*a* of the duct inner surface 50. Thus, even when the wall portion 70 is provided, the fluid can flow through a space between the upper end 73 of the wall portion 70 and the upper surface 50*a* of the duct inner surface 50. Therefore, perfbnnauce of the ventilation duct 10 can be maintained.

(D) The second duct inner surface portion 52, which is located downstream of the wall portion 70, includes the tapered portion 52*a*. Thus, the channel cross-sectional area of the upstream portion of the second duct inner surface portion 52 is larger than the channel cross-sectional area of the downstream portion thereof, and the wall portion 70 can be set up (provided) in the portion with the large channel cross-sectional area. Therefore, it is possible to reduce a decrease in the channel cross-sectional area caused by providing the wall portion 70, and is also possible to reduce an increase in pressure loss of the flow caused by providing the wall portion 70.

(E) Since the bent portion 41, in which the downstream portion is bent upward with respect to the upstream portion, is provided in the connecting portion 40, the flow direction of the fluid flowing through the bent portion 41 is changed upward. In addition, the wall portion 70 is provided on the lower surface 50*b* of the duct inner surface 50 in the bent portion 41. The foreign substance 91 that has flowed into the fluid channel 60 through the intake port 20 attempts to flow straight due to the inertia force. Therefore, a flow of the foreign substance 91 is not bent or is not fully bent upward in the bent portion 41, and the foreign substance 91 collides with the wall portion 70. Thus, the foreign substance 91 can be efficiently separated from the primary stream of the fluid.

(F) Also in the case where the ventilation duct 10 is the intake duct through which air is supplied to the engine 100 of the vehicle and the fluid flowing through the fluid channel 60 is the air, the above effects (A) to (E) can be obtained. Thus, it is possible to reduce the possibility that a foreign substance enters the engine 100, and to secure an amount of low-temperature air (the outside air) to be sucked into the engine 100. Therefore, it is possible to reduce the possibility of occurrence of knocking, the possibility of deterioration of combustion efficiency of the engine, and the possibility of deterioration of fuel economy.

Next, a description will be provided on the structure and the effects of the portions unique to each of the embodiments of the disclosure. The first embodiment of the disclosure will be described with reference to FIG. 1 to FIG. 3. In the first embodiment of the disclosure, as shown in FIG. 2, when seen from the upstream side in the flow direction of the fluid flowing through the fluid channel 60 (i.e., in the view seen in the direction shown by the arrow A in the drawing), the wall portion 70 is continuously provided in an entire region from the right side to the left side of the duct inner surface 50, that is, between the right and left side surfaces 50*c*, 50*d* of the duct inner surface 50.

Figure 6:
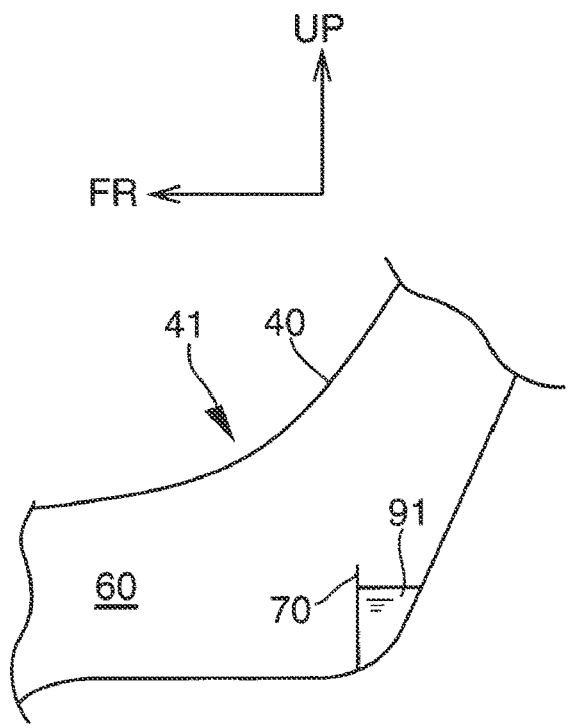
FIG. 6 is a view of a comparative example different from the embodiment of the disclosure and is a schematic partial sectional side of a ventilation duct in a state where foreign substance remains in an area downstream of a wall portion.

The wall portion 70 is continuously provided between the right and left side surfaces 50*c*, 50*d*. Thus, in the cage where a foreign substance 91 cannot be fully separated by the wall portion 70 and thus flows beyond the wall portion 70, as shown in FIG. 6 that shows a comparative example different from the embodiment of the disclosure, the foreign substance 91 that has flowed beyond the wall portion 70 may remain in an area downstream of the wall portion 70. In view of the above, in the first embodiment of the disclosure, as shown FIG. 2, a connecting wall portion 80 is provided to extend in a downstream direction from the upper end 73 of the wall portion 70 to the lower surface 50*b* of the duct inner surface 50 (the second duct inner surface portion 52). The connecting wall portion 80 extends in the horizontal direction or extends such that a downstream end of the connecting wall portion 80 is located above an upstream end of the connecting wall portion 80. The connecting wall portion 80 is continuously provided in the entire region between the right and left side surfaces 50*c*, 50*d* of the duct inner surface 50. Since the connecting wall portion 80 is provided, as shown in FIG. 3, a step shape is formed by the lower surface 50*b* of the duct inner surface 50 upstream of the wall portion 70, the wall portion upstream surface 71, and an upper surface 81 of the connecting wall portion 80.

In the first embodiment of the disclosure, the following unique effects can be obtained. (G) The wall portion 70 is continuously provided in the entire region from the right side to the left side of the duct inner surface 50 when seen from the upstream side in the flow direction of the fluid flowing through the fluid channel 60 (i.e., in the view seen in the direction shown by the arrow A in the drawing). Therefore, the effects of (A) to (F) described above can be obtained in the entire region from the right side to the left side of the duct inner surface 50.

(H) The connecting wall portion 80 is provided to extend toward the downstream side from the upper end 73 of the wall portion 70 to the lower surface 50*b* of the duct inner surface 50. The connecting wall portion 80 extends in the horizontal direction or extends such that the downstream end of the connecting wall portion 80 is located above the upstream end of the connecting wall portion 80. Thus, even in the case where a foreign substance 91 cannot be fully separated by the wall portion 70 and thus flows beyond the wall portion 70, the foreign substance 91 that has flowed beyond the wall portion 70 can be returned to an area upstream of the wall portion 70 along the upper surface 81 of the connecting wall portion 80. Therefore, it is possible to reduce the possibility that the foreign substance 91 that has flowed beyond the wall portion 70 remains in an area downstream of the wall portion 70.

The second embodiment of the disclosure will be described with reference to FIG. 4 and FIG. 5. In the second embodiment of the disclosure, as shown in FIG. 4, a plurality of wall portions 70 are provided at different positions in the flow direction of the fluid flowing through the fluid channel 60. Each of the wall portions 70 has a cutout portion 74 provided in a part of the wall portion 70 in the right-left direction when seen from the upstream side in the flow direction of the fluid flowing through the fluid channel 60 (i.e., in the view seen in the direction shown by the arrow A in the drawing). Note that the number of the wall portions

70 may be two, three, or more. In the illustrated example of the disclosure, the two wall portions 70 are provided. In addition, one cutout portion 74 or a plurality of cutout portions 74 may be provided in one wall portion 70.

Two wall portions 70a, 70b of the plurality of wall portions 70 are provided at mutually adjacent positions in the flow direction of the fluid flowing through the fluid channel 60, and the two wall portions 70a, 70b are provided such that the cutout portions 74 thereof are provided at different positions from each other in the right-left direction when seen from the upstream side in the flow direction of the fluid flowing through the fluid channel 60 (i.e., in the view seen in the direction shown by the arrow A in the drawing). Thus, the cutout portions 74 of the two wall portions 70a, 70b do not overlap each other.

In the second embodiment of the disclosure, the following unique effects can be obtained. (I) The plurality of wall portions 70 are provided at the different positions in the flow direction of the fluid flowing through the fluid channel 60. Each of the wall portions 70 has the cutout portion 74 provided in a part of the wall portion 70 in the right-left direction when seen from the upstream side in the flow direction of the fluid flowing through the fluid channel 60 (i.e., in the view seen in the direction shown by the arrow A in the drawing). Thus, even in the case where a foreign substance 91 cannot be fully separated by the wall portions 70 and thus flows beyond the wall portions 70, the foreign substance 91 that has flowed beyond the wall portions 70 can be returned to an area upstream of the wall portions 70 through the cutout portions 74. Therefore, it is possible to reduce the possibility that the foreign substance 91 that has flowed beyond the wall portions 70 remains in an area downstream of the wall portions 70 (see FIG. 6).

(J) In the two wall portions 70a, 70b that are provided at the mutually adjacent positions in the flow direction of the fluid flowing through the fluid channel 60, the cutout portions 74 are provided at the different positions from each other in the right-left direction when seen from the upstream side in the flow direction of the fluid flowing through the fluid channel 60 (in the view seen in the direction shown by the arrow A in the drawing). Thus, even in the case where the foreign substance 91 flows through the cutout portion 74 of the upstream side wall portion 70a of the two wall portions 70a, 70b, the foreign substance 91 collides with the downstream side wall portion 70b of the two wall portions 70a, 70b. Therefore, even in the case where the cutout portion 74 is provided, a foreign substance separation effect (an effect of separating a foreign substance) provided by the wall portion 70 is not degraded and can be fully obtained.

What is claimed is:

1. A ventilation duct comprising:
   an intake port through which fluid is sucked in from a front side of a vehicle;
   a discharge port that is located above the intake port;
   a connecting portion that connects the intake port and the discharge port; and
   a duct inner surface that is an inner surface of the connecting portion, the duct inner surface being provided such that a fluid channel is provided inside the duct inner surface,
   wherein a wall portion is provided only on a lower surface of the duct inner surface to linearly extend upward from the lower surface of the duct inner surface and to extend in a right-left direction when seen from an upstream side in a flow direction of the fluid flowing through the fluid channel,
   wherein a bent portion is provided in an upper surface of the connecting portion, and a downstream portion of the bent portion is bent upward with respect to an upstream portion of the bent portion,
   wherein the wall portion is provided on the duct inner surface at a position that faces the bent portion, and the wall portion is provided at a position that faces the intake port,
   wherein a portion of the lower surface of the duct inner surface, provided between the intake port and the wall portion, is flat,
   wherein the intake port and the wall portion are provided on substantially a same plane extending in a vehicle front-rear direction, and
   wherein a connecting wall portion is provided to extend in a downstream direction from an upper end of the wall portion to the lower surface of the duct inner surface, and the connecting wall portion extends such that a downstream end of the connecting wall portion is located above an upstream end of the connecting wall portion.

2. The ventilation duct according to claim 1, wherein an angle defined by a wall portion upstream surface of the wall portion and the lower surface of the duct inner surface at a position upstream of the wall portion upstream surface is equal to or smaller than 110 degrees, the wall portion upstream surface being a surface at an upstream side of the wall portion.

3. The ventilation duct according to claim 1, wherein an upper end of the wall portion is located at a position away from an upper surface of the duct inner surface.

4. The ventilation duct according to claim 1, wherein:
   the duct inner surface includes a first duct inner surface portion located upstream of the wall portion, and a second duct inner surface portion located downstream of the wall portion;
   the second duct inner surface portion includes a tapered portion; and
   in the tapered portion, a tilt angle of the lower surface of the duct inner surface with respect to a horizontal direction is steeper than a tilt angle of an upper surface of the duct inner surface with respect to the horizontal direction such that a channel cross-sectional area is reduced toward a downstream side.

5. The ventilation duct according to claim 1, wherein:
   the ventilation duct is an intake duct through which air is supplied to an engine of a vehicle; and
   the fluid flowing through the fluid channel is the air.

6. The ventilation duct according to claim 1, wherein the wall portion is continuously provided in an entire region from a right side to a left side of the duct inner surface when seen from the upstream side in the flow direction of the fluid flowing through the fluid channel.

7. The ventilation duct according to claim 1, wherein a channel cross-sectional area of the fluid channel defined by the wall portion is smaller than a channel cross-sectional area of the fluid channel at a position upstream of the wall portion and is smaller than a channel cross-sectional area of the fluid channel at a position downstream of the wall portion.

* * * * *